US012779728B2

(12) United States Patent
Li et al.

(10) Patent No.: US 12,779,728 B2
(45) Date of Patent: Nov. 3, 2026

(54) LIVING WOOD AND METHODS FOR MAKING THE SAME

(71) Applicants: Purdue Research Foundation, West Lafayette, IN (US); Michigan State University, East Lansing, MI (US)

(72) Inventors: Tian Li, West Lafayette, IN (US); Xiwei Shan, West Lafayette, IN (US); Eva Haviarova, West Lafayette, IN (US); Gemma Reguera, East Lansing, MI (US); Gregory Bonito, East Lansing, MI (US); Jinxing Li, East Lansing, MI (US)

(73) Assignees: Purdue Research Foundation, West Lafayette, IN (US); Michigan State University, East Lansing, MI (US)

( * ) Notice: Subject to any disclaimer, the term of this patent is extended or adjusted under 35 U.S.C. 154(b) by 0 days.

(21) Appl. No.: 18/922,333

(22) Filed: Oct. 21, 2024

(65) Prior Publication Data

US 2025/0128450 A1 Apr. 24, 2025

Related U.S. Application Data

(60) Provisional application No. 63/545,115, filed on Oct. 20, 2023.

(51) Int. Cl.
*B27K 3/34* (2006.01)

(52) U.S. Cl.
CPC ............ *B27K 3/34* (2013.01); *B27K 2240/20* (2013.01)

(58) Field of Classification Search
None
See application file for complete search history.

(56) References Cited

PUBLICATIONS

Raut et al.; Fungal Based Biopolymer Composites for Construction Materials; Materials; 2021, 14, 2906.*
Bala et al.; Recent Strategies for Bioremediation of Emerging Pollutants: A Review for a Green and Sustainable Environment; Toxics; 2022, 10, 484.*
Aiduang et al.; Amazing Fungi for Eco Friendly Composite Materials: A Comprehensive Review; J. Fungi; 2022, 8, 842.*
Li, T. et al., A Radiative Cooling Structural Material. Science, 2019, 364, 760-763, May 24, 2019.
Wang, S. et al., Transparent, Anisotropic Biofilm with Aligned Bacterial Cellulose Nanofibers. Advanced Functional Materials, 2018, 28, 1707491, 10 pgs; published online Feb. 23, 2018.
Leichti, R. J. et al., Prefabricated Wood Composite I-Beams: A Literature Review. Wood and Fiber Science, 22(1), 1990, pp. 62-79.
Pelaez-Samaniego, M. R. et al., A Review of Wood Thermal Pretreatments to Improve Wood Composite Properties. Wood Sci. Technol., 2013, 47:1285-1319; published online Jul. 27, 2013.

(Continued)

*Primary Examiner* — Michael P. Rodriguez
(74) *Attorney, Agent, or Firm* — Purdue Research Foundation

(57) ABSTRACT

A method for enhancing wood may include sterilizing the wood. The wood may be inoculated with a fungi to establish a mycelial scaffold within the wood. The mycelia scaffold may be infiltrated with bacteria. Then the bacteria may be incubated so that voids in the wood are filled with biopolymer and biominerals generated by the bacteria.

10 Claims, 4 Drawing Sheets

(56) References Cited

PUBLICATIONS

Gardner, D. J. et al., Wood-Plastic Composite Technology. Current Forestry Reports, 2015, 1:139-150; published online Jun. 4, 2015.
Fang, C.-H. et al., Densification of Wood Veneers by Compression Combined with Heat and Steam. Eur. J. Wood Wood Prod., 2012, 70:155-163; published online Feb. 1, 2011.
Song, J. et al., Processing Bulk Natural Wood into a High-Performance Structural Material. Nature 2018, 554, 224-228; Feb. 8, 2018.
Kutnar, A. et al., Densification of Wood. Zbornik gozdarstva in lesarstva, 2007, s. 53-62.
Laine, K. et al., Wood Densification and Thermal Modification: Hardness, Set-Recovery and Micromorphology. Wood Sci. Technol., 2016, 50:883-894; published online May 18, 2016.
Gwenzi, W., Carbon Sequestration via Biomineralization: Processes, Applications and Future Directions. Chapter 5 In Sustainable Agriculture Reviews 37: Carbon Sequestration vol. 1 Introduction and Biochemical Methods, Inamuddin et al. (eds), Springer Nature Switzerland AG, 2019, pp. 93-106. https://doi.org/10.1007/978-3-030-29298-0_5.
Estroff, L.A., Introduction: Biomineralization. Chemical Reviews, 2008, vol. 108, No. 11, 4329-4331; published on web Nov. 12, 2008.
Deveau, A. et al., Bacterial-Fungal Interactions: Ecology, Mechanisms and Challenges. FEMS Microbiology Reviews, fuy008, 42, 2018, 335-352.
Kuo, C.-H. et al., Utilization of Acetate Buffer to Improve Bacterial Cellulose Production by Gluconacetobacter Xylinus. Food Hydrocolloids, 53, 2016, 98-103; available online Jan. 3, 2015.
DJ Case & Associates in collaboration with Purdue University Center for Regional Development, Indiana Hardwood Assessment, prepared for: Indiana Department of Agriculture. Dec. 20, 2018, 140 pgs.
Li, T. et al., Wood Composite as an Energy Efficient Building Material: Guided Sunlight Transmittance and Effective Thermal Insulation. Advanced Energy Materials, 2016, 6, 1601122; published online Aug. 11, 2016, 7 pgs.
Li, T. et al., Anisotropic, Lightweight, Strong, and Super Thermally Insulating Nanowood with Naturally Aligned Nanocellulose. Science Advances, 2018, 4: eaar3724, Mar. 9, 2018, 9pgs.
Millet, L. J. et al., Increasing Access to Microfluidics for Studying Fungi and Other Branched Biological Structures. Fungal Biology and Biotechnology, 2019, 6:8; published online Jun. 10, 2019.
Sakkaff, Z. et al., Applying Molecular Communication Theory to Multi-Scale Integrated Models of Biological Pathways. Proceedings of the Sixth Annual ACM International Conference on Nanoscale Computing and Communication (NANOCOM '19), Sep. 25-27, 2019, Dublin, Ireland, 2019, p. 1-2, Article 3345495.
Unluturk, B. D., et al., The Impact of Social Behavior on the Attenuation and Delay of Bacterial Nanonetworks. IEEE Transactions on Nanobioscience, vol. 15, No. 8, Dec. 2016, pp. 959-969.
Wilken, St. E. et al., In Silico Identification of Microbial Partners to Form Consortia with Anaerobic Fungi. Processes, 2018, 6, 7; published Jan. 15, 2018.
Liu, L. et al., Developing *Bacillus* spp. as a Cell Factory for Production of Microbial Enzymes and Industrially Important Biochemicals in the Context of Systems and Synthetic Biology. Appl. Microbiol. Biotechnol., 2013, 97: 6113-6127; published online Jun. 11, 2013.
American Society for Testing and Materials (ASTM International). Standard Test Methods for Small Clear Specimens of Timber. D143-94, (2000). https://www.astm.org/d0143-94.html.
Baibek, A. et al., Dyeing Fungi: Amphotericin B Based Fluorescent Probes for Multiplexed Imaging. Chem. Commun., 2021, 57, 1899-1902.
Qing, H. et al., 3D Hierarchical Computational Model of Wood as a Cellular Material with Fibril Reinforced, Heterogeneous Multiple Layers. Mechanics of Materials, 41, 2009, 1034-1049.
Hölzl, K. et al., Bioink properties before, during and after 3D Bioprinting. Biofabrication, 2016, 8, 032002; published Sep. 23, 2016.
Perez-Garcia, O. et al., Metabolic Network Modeling of Microbial Interactions in Natural and Engineered Environmental Systems. Frontiers in Microbiology, 2016, vol. 7, Article 673, 30 pgs.; published May 18, 2016.

* cited by examiner

LIVING WOOD AND METHODS FOR MAKING THE SAME

CROSS REFERENCE TO RELATED APPLICATIONS

This application claims the benefit of U.S. Provisional Application No. 63/545,115 filed Oct. 20, 2023, the entirety of which is hereby incorporated by reference.

GOVERNMENT SUPPORT

This invention was made with government support under DE-AR0001638 awarded by the Department of Energy. The government has certain rights in the invention.

TECHNICAL FIELD

This disclosure relates to building materials and, in particular, to wood building materials.

BACKGROUND

Wood engineering towards high mechanical strength includes two general strategies: (1) wood composite, and (2) direct treatment of wood to minimize its porosity with preserved wood load-bearing structure. However, conventional wood composite materials typically require chipping and shredding of wood. Wood chips have high volume and a damaged structure, which often requires additional polymers, fillers, and other additives. Direct wood treatment, on the other hand, often requires heavy use of chemicals with a large carbon footprint due to the difficulty in the uniformity of chemical treatment of wood blocks.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
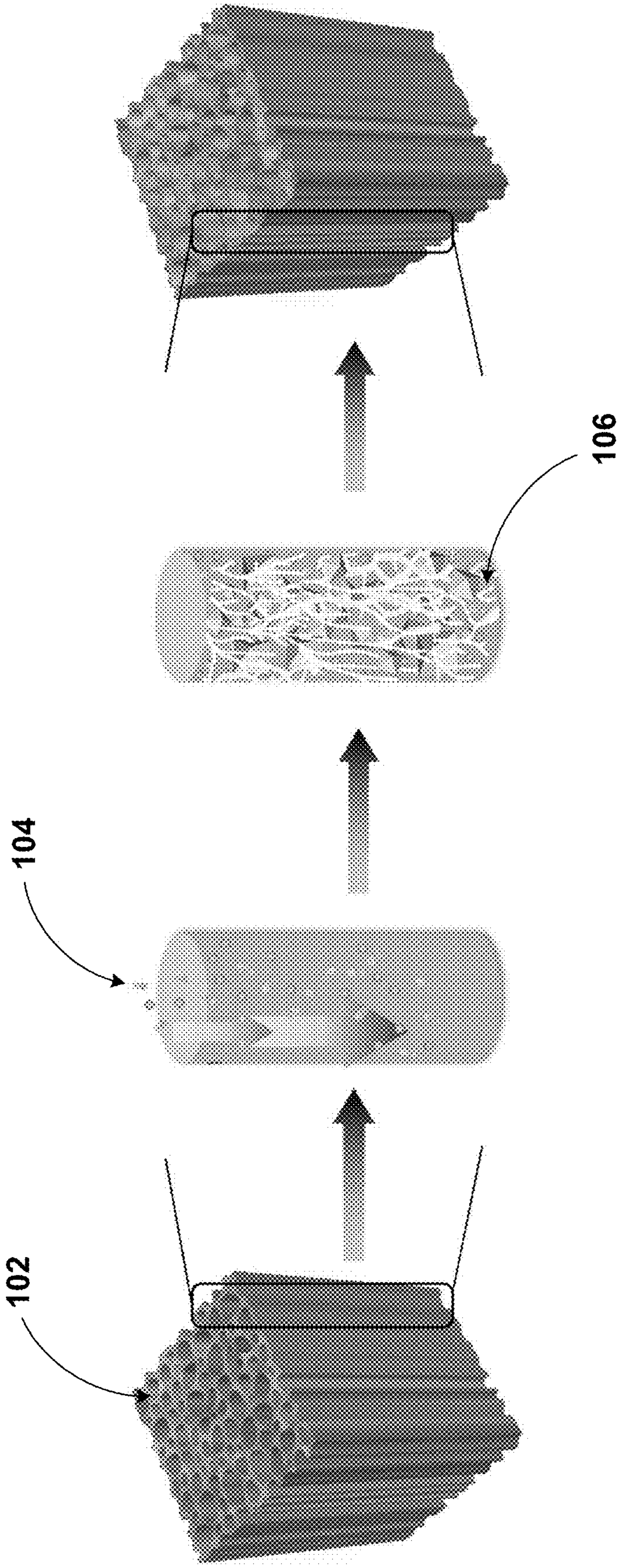
FIG. 1 illustrates an example wood being transformed to living wood.

Living trees sequester carbon by pulling CO2 from the atmosphere and storing it as woody biomass. However, once processed as building materials, natural wood loses its carbon capturing capacity and becomes vulnerable to microbial decomposition and weathering. These processes generate cracks and failures, shorten service life, and limit the use of wood-based materials as building elements, especially in tall buildings. The development of strong wood materials with low carbon footprint and improved performance metrics has the potential to render significant carbon storage in new and retrofitted buildings. Wood engineering towards high mechanical strength includes two general strategies: (1) wood composite 3-5, and (2) direct treatment of wood to minimize its porosity with preserved wood load-bearing structure 1,6-9. However, conventional wood composite materials typically require chipping and shredding of wood. Wood chips have high volume and a damaged structure, which often requires additional polymers, fillers, and other additives. Direct wood treatment, on the other hand, often requires heavy use of chemicals with a large carbon footprint due to the difficulty in the uniformity of chemical treatment of wood blocks.

The methods described herein provide "living wood" by harnessing the natural activities of microbes and their interaction with wood scaffolds to fundamentally change how the wood will be processed and engineered for sustainable construction. Microbes are used to significantly reinforce the wood composite through three-fold functions: 1) Microbial infiltration and growth within the composite matrices. 2) In situ production of bonding biomaterials within the porous space of the wood scaffold to provide a natural carbon sink and self-healing capacity. (3) In situ activation of other mineralization reactions, as needed to further reinforce the material and modulate its properties to expand manufacturing opportunities. The microbes are incorporated during the manufacturing process of the wood composite as bioinks. Such direct microbe-based bioink modification strategies on natural wood transform the dead wood into a new living, strong, carbon capturing and self-healing composites to replace the materials currently used as non-renewable structural components in buildings (e.g. steel and concrete). The method described herein also overcomes the manufacturing barrier in making scalable wood composite with intact wood scaffold with minimum $CO_2$ generation.

The method described herein harnesses the activities of living microbes to rapidly infiltrate the natural pores in wood (40% to 80% by volume in wood are hollow wood channels) and fill the void spaces with carbon-rich, bonding fillers. Carbon negativity is ensured with the carbon stored in wood and microbial networks as well as with the continued carbonation process enabled by the in situ synthesis of biofillers. Notably, the method described herein enables the use of local wood species with lower cost and lower energy/chemical consumption. Even after the new wood composite is applied as in buildings, the mineralization activities of microorganisms can still be used for continued carbonation. The microbe assisted infiltration and in situ mineralization concurrently address challenges in scaling up and market penetration, and optimizing materials properties in a cost-effective manner.

Compared with direct wood modification methods, the living wood described herein addresses the fundamental limit in the non-uniformity of chemical treatment by employing living systems as active and smart fillers of the wood scaffold. Compared with wood-mineral composite that incorporate wood particles as an aggregate in the mineral matrix, the living wood preserves natural wood's multiscale aligned structure for structural/load-bearing applications with the active pore filling with living microbes, which will lead to improved mechanical strength, uniform reaction and fewer technical barriers when scaling up. Compared with natural fungal mycelia, which lacks a load-bearing matrix, living wood can provide guided growth of the bionetwork into an interconnected and strong backbone FIG. 1 illustrates an example wood being transformed to living wood according to the method described herein. A wood sample is cut to a specific size (e.g., red oak blocks of 1 cm×1 cm×5 cm) to maximize pore opening 102 and facilitate the infiltration process. The capillary effect of the wood is leveraged to enhance water and absorption of bioink 104 into the wood's natural vertical channels. A bioink includes a suspension of fungal spores, bacterial cells, and/or mycelial fragments, combined with essential nutrients needed for microbial development. It refers to a carrier solution which serves as a delivery medium. The bioink ensures that the microorganisms are evenly distributed throughout the wood's porous structure, facilitating their growth and interaction within the material.

Then, the wood is sterilized. For example, the wood may be sterilized in a malt extract broth (e.g. 1%).

Sequential inoculation strategies are employed to enhance the co-existence of fungi and bacteria. Fungi are first inoculated to establish a mycelial scaffold, followed by bacterial infiltration to fill the remaining spaces with bacterial cellulose. Techniques like passive infiltration and vacuum assisted infiltration may be used to ensure uniform penetration of microorganisms throughout the wood's structure. Fungi are introduced first because their mycelial networks can effectively penetrate and colonize the porous structure of wood. The mycelium forms a complex, fibrous network referred to as a mycelial scaffold 106 that binds to the cell walls of the wood and occupies a significant portion of the wood's pores. Once the mycelial scaffold 106 is established, bacteria are introduced to fill the remaining spaces with biopolymers and/or biominerals. Several infiltration techniques are employed to optimize microbial colonization including passive infiltration and vacuum-assisted infiltration.

Biopolymers are natural polymers produced by living organisms. They include monomeric units that are covalently bonded to form larger structures. An example of a biopolymer is bacterial cellulose, which is produced by certain bacteria and consists of glucose units that form long, strong fibers. Other examples include chitin and the long-chain polymers found in mycelium produced by fungi. Biominerals are inorganic compounds produced by biological organisms, often serving structural or protective functions. For instance, calcium carbonate ($CaCO_3$) produced by bacteria is a common example of a biomineral.

For each step of infiltration, the wood is incubated at optimal conditions for microbes' growth, typically at room temperature for 1-2 weeks. During the first period, the fungi grow and colonize the wood's internal structures, forming a mycelial network. This mycelial network, created by the fungal hyphae, serves as a scaffold that supports the subsequent infiltration and colonization by bacteria. During the second growing period, the bacteria are later introduced to fill the remaining spaces with bacterial cellulose, further reinforcing the wood's structure. The growth stops when the pours and interior channels are filled.

The wood is then post-processed. For example, the wood may be oven banked where the sample is dried with convection, such as in a forced air convention oven. Alternatively or in addition, the wood may be hot pressed where a sample is first hot pressed in a fixed thickness model (i.e. stainless steel), and then transferred to a convention oven for cooling curing.

Various fungal and bacterial may be used depending on the design goal for achieving compatibility with wood, carbon conversion efficiency, and ability to increase wood strength:

The fungi may include White-rot Fungi (Lignin degradation). White-rot fungal species are known for their ability to degrade lignin, a key component of wood, making it more porous and suitable for microbial colonization. This lignin reduction allows better integration of the mycelium, which acts as a fiber network inside the wood structure. The mycelium fibers enhance the mechanical properties of the wood, increasing tensile strength and toughness. The fungi also assist in reducing wood's natural carbon emissions by converting ambient carbon into fungal biomass.

For example, the fungi may include *Ganoderma* spp. *Ganoderma lucidum* and *Ganoderma sessile*: were tested and selected for their lignin degradation capacity and ability to create strong mycelial networks. *Ganoderma* species can penetrate deeply into wood structures, providing mechanical benefits while aiding in carbon fixation through fungal biomass production. Other possible white-rot fungi species for achieving lignin degradation include *Phanerochaete chrysosporium, Trametes versicolor*

The fungi may include Brown-rot Fungi (Cellulose preservers). For example, the fungi may include *Gloeophyllum trabeum*. While it targets hemicellulose and lignin, *G. trabeum* leaves the cellulose content relatively intact. This property may be beneficial in applications where maintaining cellulose is critical for strength while reducing lignin for microbial colonization.

Alternatively or in addition, the fungi may include *Postia placenta*: Another brown-rot fungus, *P. placenta* is known for its rapid wood degradation but selective targeting of non-cellulose components. It is a candidate for enhancing porosity and preparing wood for bacterial colonization without compromising overall structural strength.

The fungi may include other species suitable for mycelium fiber production. For example, the fungi may include *Pleurotus* spp. Commonly known as oyster mushrooms, these species form extensive mycelial networks, which can act as scaffolds in wood. These networks not only enhance the wood's mechanical properties but also provide a foundation for further bacterial colonization.

Alternatively or in addition, the fungi may include *Schizophyllum commune*: This fungus is known for its ability to form durable mycelial fibers that increase tensile strength. Its biotechnological applications, including enzyme production and biofiller potential, make it a versatile candidate for wood treatment.

The bacteria may include bacteria which facilitates Carbon capture and/or biomass production. Bacteria, specifically cellulose-producing strains such as *Komagataeibacter xylinus*, are introduced after fungal infiltration. They attach to the pre-existing mycelium fibers and produce bacterial cellulose, which acts as a biofiller within the wood's pores. This filling of pores with bacterial cellulose strengthens the wood and can contribute to calcite formation if carbon sources like CO2 are present. The bacteria's ability to attach and fill the spaces depends on the mycelial structure laid down by the fungi, allowing for synergistic enhancement.

For example, the bacteria may include *Komagataeibacter* spp. *Komagataeibacter hansenii* and *Komagataeibacter xylinus* were tested and selected. Known for high cellulose production, particularly in wood environments. Alternatively or in addition, the bacteria may include *Pseudomonas* spp. Known for its metabolic versatility, eg: *P. putida* can utilize various carbon sources, including ambient CO2, making it a potential candidate for biofiller production in wood.

A key to enhancing the mechanical properties of wood through microbial treatments lies in the synergistic combination of fungal mycelium and bacterial cellulose. These components work together to fill the wood's natural pores, increasing its strength and toughness.

Figure 2:
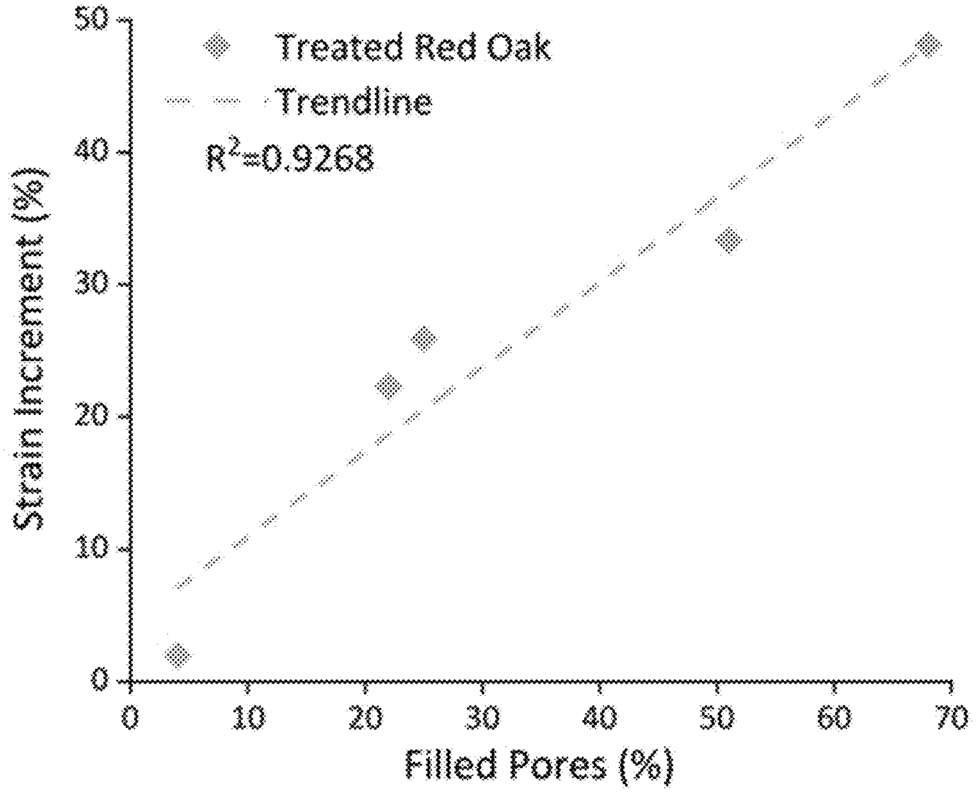
FIG. 2 illustrates strain-pore filling percentage curves comparing various mycelium filled red oak.

FIG. 2 illustrates strain-pore filling percentage curves comparing various mycelium filled red oak. *Ganoderma sessile* have been shown to effectively infiltrate wood pores and form a mycelial network within the wood structure. This mycelium acts as a scaffold, which not only strengthens the wood itself but also facilitates bacterial cellulose production. The fungal mycelium network fills approximately 70% of the wood's internal pore space within two weeks, as observed in multiple trials. In FIG. 2, the strain-pore filling percentage curves show the progression from barely filled pores to over 70% filled pores, with noticeable improvements in strain flexibility due to the structural support provided by the mycelium network.

Figure 3:
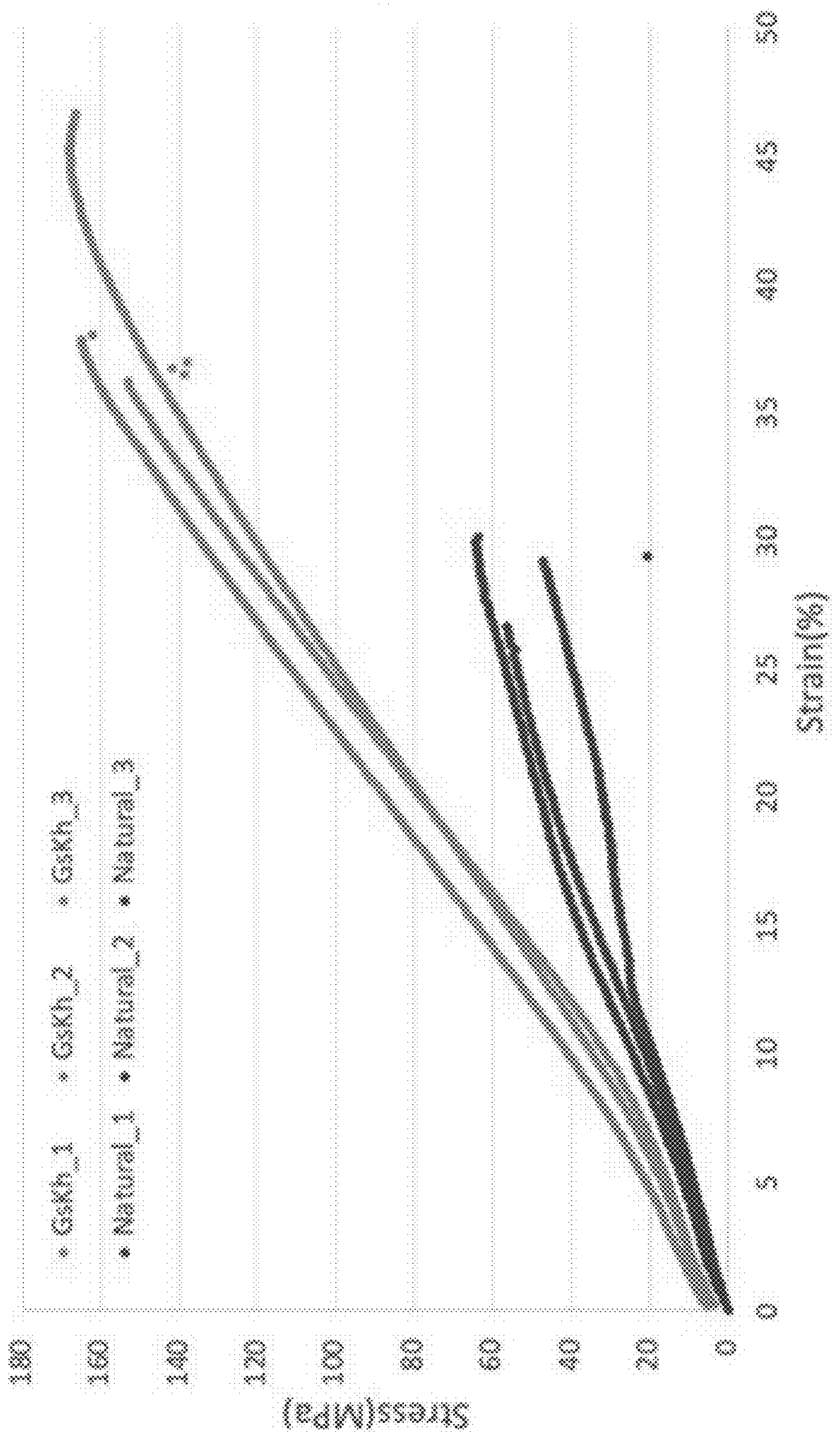
FIG. 3 illustrates strain stress curves of untreated red oak and red oak based living wood.

FIG. 3 illustrates strain stress curves of untreated red oak and red oak based living wood. The bottom grouping of curves corresponds to the untreaded red oak and the top grouping of curves correspond to the red oak based living wood.

In multiple trials with red oak, mechanical tests showed that the living wood samples achieved a tensile strength of 161.97 MPa compared to 55.91 MPa in untreated wood—representing a more than 200% increase in strength. The post-infiltration samples also showed a reduction in lignin content and an increase in cellulose content, further supporting the idea that these microbial treatments enhance the overall material properties of wood.

As illustrated in Table 1 and Table 2, the cellulose-to-lignin ratio in the treated wood was observed to shift from ~1.7 to over 2.6, further contributing to the strength enhancement after post processing. This change is crucial because a higher cellulose content correlates with increased mechanical strength, while the reduction of lignin indicated for successful microbial inoculation.

TABLE 1

Nature red oak composition result,

| Test set | Cellulose(%) | Lignin(%) | C/L Ratio |
|---|---|---|---|
| 1 | 42.9 | 23.6 | 1.82 |
| 2 | 42.0 | 24.3 | 1.73 |
| 3 | 41.1 | 24.5 | 1.68 |

TABLE 2

Red oak based living wood composition result,

| Test set | Cellulose(%) | Lignin(%) | C/L Ratio |
|---|---|---|---|
| 1 | 48.5 | 18.1 | 2.68 |
| 2 | 52.9 | 17.7 | 2.99 |
| 3 | 44 | 19 | 2.32 |

Figure 4:
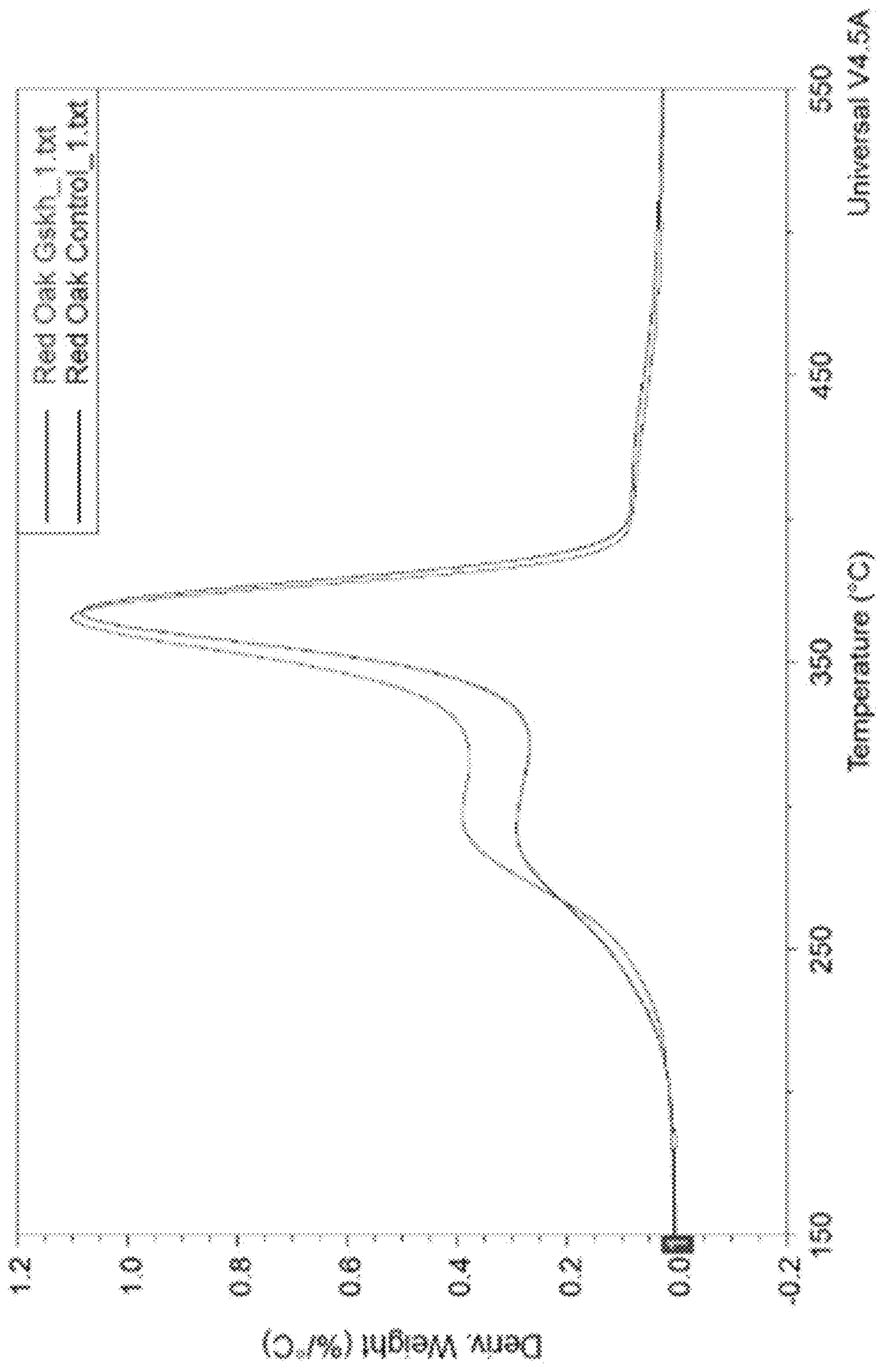
FIG. 4 illustrates derivative thermogravimetric of nature red oak comparing with red oak based living wood.

FIG. 4 illustrates derivative thermogravimetric of nature red oak (blue) comparing with red oak based living wood (green). FIG. 4 compares the derivative thermogravimetric (DTG) analysis of natural red oak with red oak treated via microbial infiltration (referred to as "living wood"). DTG measures the rate of weight loss of a material as it is heated, providing insights into the material's thermal stability and composition, specifically in terms of the degradation of organic components such as cellulose and lignin.

The first peak in the DTG curve corresponds to the degradation of cellulose, while the second peak represents the degradation of lignin. In the treated wood, the shift toward a higher weight loss rate at the first peak indicates an increase in cellulose content, which is attributed to the bacterial cellulose produced during the treatment process.

The reduction in lignin content is evidenced by the shift to a lower temperature at the second peak, along with a broader zone between the first and second peaks. This confirms the successful degradation of lignin by the selected fungi, making the wood more porous and facilitating microbial colonization.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:

sterilizing a wood;

inoculating the wood with a fungi to establish a mycelial scaffold within the wood;

infiltrating, after the wood is inoculated with the fungi, the mycelial scaffold with bacteria; and incubating the bacteria so that voids in the wood are filled with biopolymer and biominerals generated by the bacteria.

2. The method of claim 1, further comprising curing the wood.

3. The method of claim 2, wherein curing the wood comprises:

drying the wood with convection.

4. The method of claim 2, wherein curing the wood comprises hot pressing the wood in a fixed thickness model and transferring the hot pressed wood to a convection oven for cooling curing.

5. The method of claim 1, where in the fungi comprises a white-rot fungi configured to degrade lignin in the wood.

6. The method of claim 5, wherein the fungi comprises a *Ganoderma* species.

7. The method of claim 1, wherein the fungi comprises a brown-rot fungi configured to preserve cellulose while reducing lignin in the wood.

8. The method of claim 7, wherein fungi comprises *Gloeophyllum trabeum, Postia placenta,* or a combination thereof.

9. The method of claim 1, wherein the fungus comprises *Pleurotus* spp., *Schizophyllum commune,* or a combination thereof.

10. The method of claim 1, wherein the bacteria comprises *Komagataeibacter* spp., *Pseudomonas* spp., or a combination thereof.

* * * * *